(12) United States Patent
Surana et al.

(10) Patent No.: US 11,928,811 B2
(45) Date of Patent: Mar. 12, 2024

(54) SYSTEM AND METHOD FOR STRUCTURAL VIBRATION MODE IDENTIFICATION

(71) Applicant: Raytheon Technologies Corporation, Farmington, CT (US)

(72) Inventors: Amit Surana, Newington, CT (US); Sudarshan N. Koushik, West Hartford, CT (US); Kenji Homma, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 413 days.

(21) Appl. No.: 17/217,427

(22) Filed: Mar. 30, 2021

(65) Prior Publication Data
US 2022/0318973 A1    Oct. 6, 2022

(51) Int. Cl.
    G06T 7/00        (2017.01)
    G01H 9/00        (2006.01)
    G01M 7/00        (2006.01)

(52) U.S. Cl.
    CPC .............. G06T 7/001 (2013.01); G01H 9/00 (2013.01); G01M 7/00 (2013.01)

(58) Field of Classification Search
    CPC ............ G06T 7/001; G01H 9/00; G01M 7/00
    See application file for complete search history.

(56) References Cited

U.S. PATENT DOCUMENTS 10,101,252 B2    10/2018  Nelagadde
10,567,655 B2     2/2020  Yang
2006/0079782 A1   4/2006  Beach
2011/0153217 A1   6/2011  Rodney
2013/0110476 A1   5/2013  Delvaux

FOREIGN PATENT DOCUMENTS

JP    6364845    8/2018

OTHER PUBLICATIONS

Dawson et al. "Characterizing and correcting for the effect of sensor noise in the dynamic mode decomposition." Experiments in Fluids, 57(3):42, 2016.
Jovanovic et al. "Sparsity-promoting dynamic mode decomposition." Physics of Fluids, 26(2):024103, 2014.
Le Clainche et al. "Spatio-temporal koopman decomposition." Journal of Nonlinear Science, 28(5):1793-1842, 2018.
Masjedian et al. "A review on operational modal analysis researches: classification of methods and applications." Proc. of the 3rd IOMAC, pp. 707-718, 2009.

(Continued)

*Primary Examiner* — Natalie Huls
*Assistant Examiner* — Cynthia L Davis
(74) *Attorney, Agent, or Firm* — Getz Balich LLC

(57) ABSTRACT

A method for determining structural vibration mode characteristics includes preparing a digital image correlation (DIC) dataset for the component, applying a dynamic mode decomposition (DMD) technique to the DIC dataset to determine a plurality of DMD modes, selecting at least one dominant DMD mode from the plurality of DMD modes, classifying each of the at least one selected dominant DMD mode as a standing wave or a traveling wave, and determining structural vibration mode characteristics of the component by extracting the structural vibration mode characteristics from each of the at least one selected dominant DMD mode having a standing wave classification.

18 Claims, 4 Drawing Sheets

(56) References Cited

OTHER PUBLICATIONS

Igor Mezic. "Analysis of fluid flows via spectral properties of the koopman operator." Annual Review of Fluid Mechanics, 45:357-378, 2013.
Saito et al. "Data-driven experimental modal analysis by dynamic mode decomposition." Journal of Sound and Vibration, p. 115434, 2020.
Tu et al. "On dynamic mode decomposition: Theory and applications." arXiv preprint arXiv:1312.0041, 2013.
EP search report for EP22165651.5 dated Jul. 26, 2022.

SYSTEM AND METHOD FOR STRUCTURAL VIBRATION MODE IDENTIFICATION

BACKGROUND

1. Technical Field

This disclosure relates generally to vibrational measurement and analysis, and more particularly to imaging systems and methods for measuring component vibration mode characteristics.

2. Background Information

Design testing and development of mechanical equipment may frequently include the use of vibrational measurement and analysis of various components, during equipment operation, to determine how those components will perform over the life of the equipment. This vibration testing may provide insight into how well components may respond to various forms of excitation during equipment operation and whether stresses applied to the components may be in excess of predetermined tolerances. However, the input excitation introduced on a component during normal equipment operation cannot always be easily characterized and may be particularly difficult to accurately determine for flow-induced vibration.

Digital image correlation (DIC) and tracking is a surface displacement measurement technique that can capture the shape, motion, and deformation of solid objects. DIC techniques employ tracking and image registration techniques for accurate 2D and 3D measurements of changes in images and can be used to measure full-field displacement and strains. Nonetheless, the application of DIC techniques to measure vibrational characteristics of components may be inadequate during operational conditions associated with certain types of equipment. Accordingly, what is needed are improved systems and methods which provide accurate, non-contact vibrational measurement and analysis under a wider range of equipment operational conditions.

SUMMARY

It should be understood that any or all of the features or embodiments described herein can be used or combined in any combination with each and every other feature or embodiment described herein unless expressly noted otherwise.

According to an aspect of the present disclosure, a method for determining structural vibration mode characteristics includes preparing a digital image correlation (DIC) dataset for the component, applying a dynamic mode decomposition (DMD) technique to the DIC dataset to determine a plurality of DMD modes, selecting at least one dominant DMD mode from the plurality of DMD modes, classifying each of the at least one selected dominant DMD mode as a standing wave or a traveling wave, and determining structural vibration mode characteristics of the component by extracting the structural vibration mode characteristics from each of the at least one selected dominant DMD mode having a standing wave classification.

In any of the aspects or embodiments described above and herein, selecting the at least one dominant DMD mode includes discarding all DMD modes of the plurality of DMD modes which include real eigenvalues, yielding remainder DMD modes of the plurality of DMD modes.

In any of the aspects or embodiments described above and herein, selecting the at least one dominant DMD mode further includes ranking the remainder DMD modes based on a norm of their amplitudes or scaled amplitudes.

In any of the aspects or embodiments described above and herein, selecting the at least one dominant DMD mode further includes selecting the ranked remainder DMD modes based on a threshold value.

In any of the aspects or embodiments described above and herein, the vibration mode characteristics include oscillation frequencies and damping ratios.

In any of the aspects or embodiments described above and herein, the component includes an imaging surface having a pattern. The method further includes obtaining DIC image data by recording a plurality of images of the imaging surface with at least one imaging device.

In any of the aspects or embodiments described above and herein, the method further includes directing a fluid flow in a direction between the component and the at least one imaging device as the imaging device records the plurality of images of the imaging surface.

In any of the aspects or embodiments described above and herein, the DIC dataset includes a DIC image data matrix and preparing the DIC dataset includes denoising the DIC image data matrix prior to applying the DMD technique to the DIC dataset.

According to another aspect of the present disclosure, a system for determining structural vibration mode characteristics of a component includes at least one imaging device and a data acquisition device in signal communication with the at least one imaging device. The data acquisition device includes a process and memory in signal communication with the processor. The memory contains instructions recorded therein which, when executed by the processor, cause the processor to prepare a digital image correlation (DIC) dataset, apply a dynamic mode decomposition (DMD) technique to the DIC dataset to determine a plurality of DMD modes, select at least one dominant DMD mode from the plurality of DMD modes, classify each of the at least one selected dominant DMD mode as a standing wave or a traveling wave, and determine structural vibration mode characteristics by extracting the structural vibration mode characteristics from each of the at least one selected dominant DMD mode having a standing wave classification.

In any of the aspects or embodiments described above and herein, the system further includes the component. The component includes an imaging surface and the at least one imaging device is positioned to obtain DIC image data from the imaging surface of the component and the DIC dataset includes the DIC image data.

In any of the aspects or embodiments described above and herein, the imaging surface includes a pattern.

In any of the aspects or embodiments described above and herein, the system further includes equipment including the component. The equipment is configured to direct a fluid flow across the imaging surface of the component and the fluid flow is located between the component and the at least one imaging device.

In any of the aspects or embodiments described above and herein, selecting the at least one dominant DMD mode includes discarding all DMD modes of the plurality of DMD modes which include real eigenvalues, yielding remainder DMD modes of the plurality of DMD modes.

In any of the aspects or embodiments described above and herein, selecting the at least one dominant DMD mode further includes ranking the remainder DMD modes based on a norm of their amplitudes or scaled amplitudes.

In any of the aspects or embodiments described above and herein, selecting the at least one dominant DMD mode further includes selecting the ranked remainder DMD modes based on a threshold value.

In any of the aspects or embodiments described above and herein, the vibration mode characteristics include oscillation frequencies and damping ratios.

In any of the aspects or embodiments described above and herein, the at least one imaging device includes a first imaging device and a second imaging device spaced from the first imaging device.

In any of the aspects or embodiments described above and herein, the system further includes at least one accelerometer in signal communication with the data acquisition device and the at least one accelerometer is in contact with the component.

In any of the aspects or embodiments described above and herein, the at least one accelerometer is in contact with a non-imaging surface.

According to another aspect of the present disclosure, a method for determining structural vibration mode characteristics of a component includes directing, relatively, a fluid flow across an imaging surface of the component in a direction between the component and at least one imaging device, obtaining digital image correlation (DIC) image data by recording a plurality of images of the imaging surface with at least one imaging device as the fluid flow is directed across the imaging surface of the component, preparing a DIC dataset which includes the DIC image data, applying a dynamic mode decomposition (DMD) technique to the DIC dataset to determine a plurality of DMD modes, selecting at least one dominant DMD mode from the plurality of DMD modes, classifying each of the at least one selected dominant DMD mode as a standing wave or a traveling wave, and determining structural vibration mode characteristics of the component by extracting the structural vibration mode characteristics from each of the at least one selected dominant DMD mode having a standing wave classification.

The present disclosure, and all its aspects, embodiments and advantages associated therewith will become more readily apparent in view of the detailed description provided below, including the accompanying drawings.

DETAILED DESCRIPTION

Figure 1:
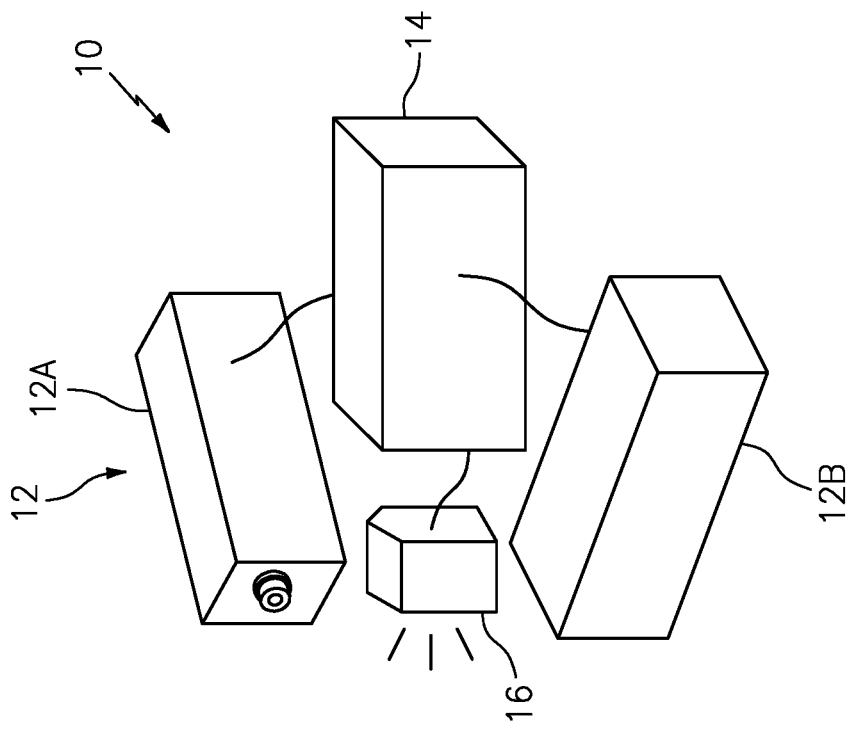
FIG. 1 illustrates an exemplary embodiment of an imaging system, in accordance with one or more aspects of the present disclosure.
Figure 1:
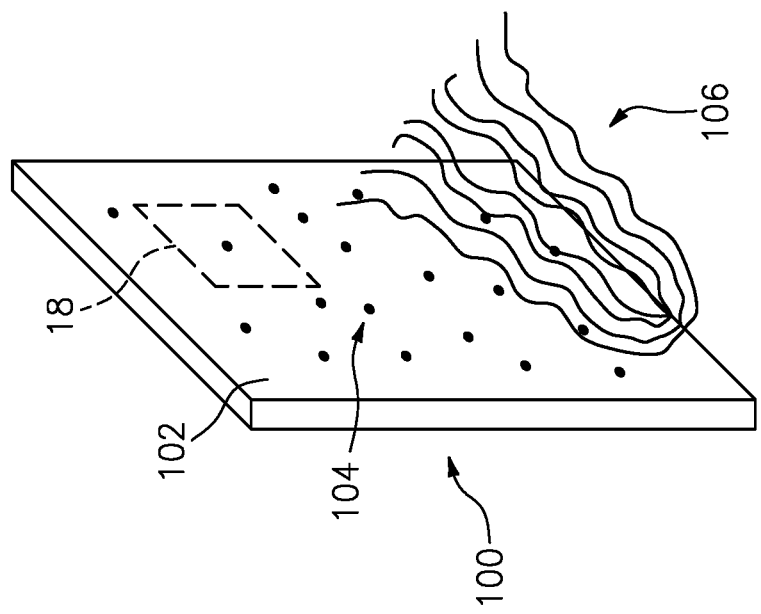

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

As previously discussed, digital image correlation (DIC) techniques can be used to measure structural vibration characteristics of one or more components (e.g., test objects) to assess structural integrity of the components during operation of the components or of equipment to which the component belongs. However, application of DIC techniques to accurately measure structural vibration of components through fluid flow disturbance can be challenging, as the fluid flow distorts the optical measurement creating spurious artifacts. In general, conventional modal identification techniques, which require known input excitation in addition to measured output structural response, cannot be used. Thus, structural vibration analysis may be limited to "output only" modal identification techniques classified as "operational modal analysis" (OMA). The OMA methods, however, cannot be directly applied to DIC image data as the fluid flow in the vicinity of the component(s) distorts the DIC measurements due to refractive index gradients caused by the fluid flow (due to density variations from shocks, turbulence, and/or temperature gradients) as may be encountered, for example, in engine applications. Accordingly, aspects of the present disclosure include a novel approach based on dynamic mode decomposition (DMD) which can be applied to DIC image data generated in such flow-obstruction scenarios to filter out flow-induced perturbations and to extract accurate structural vibration information from one or more components or test objects.

Figure 2:
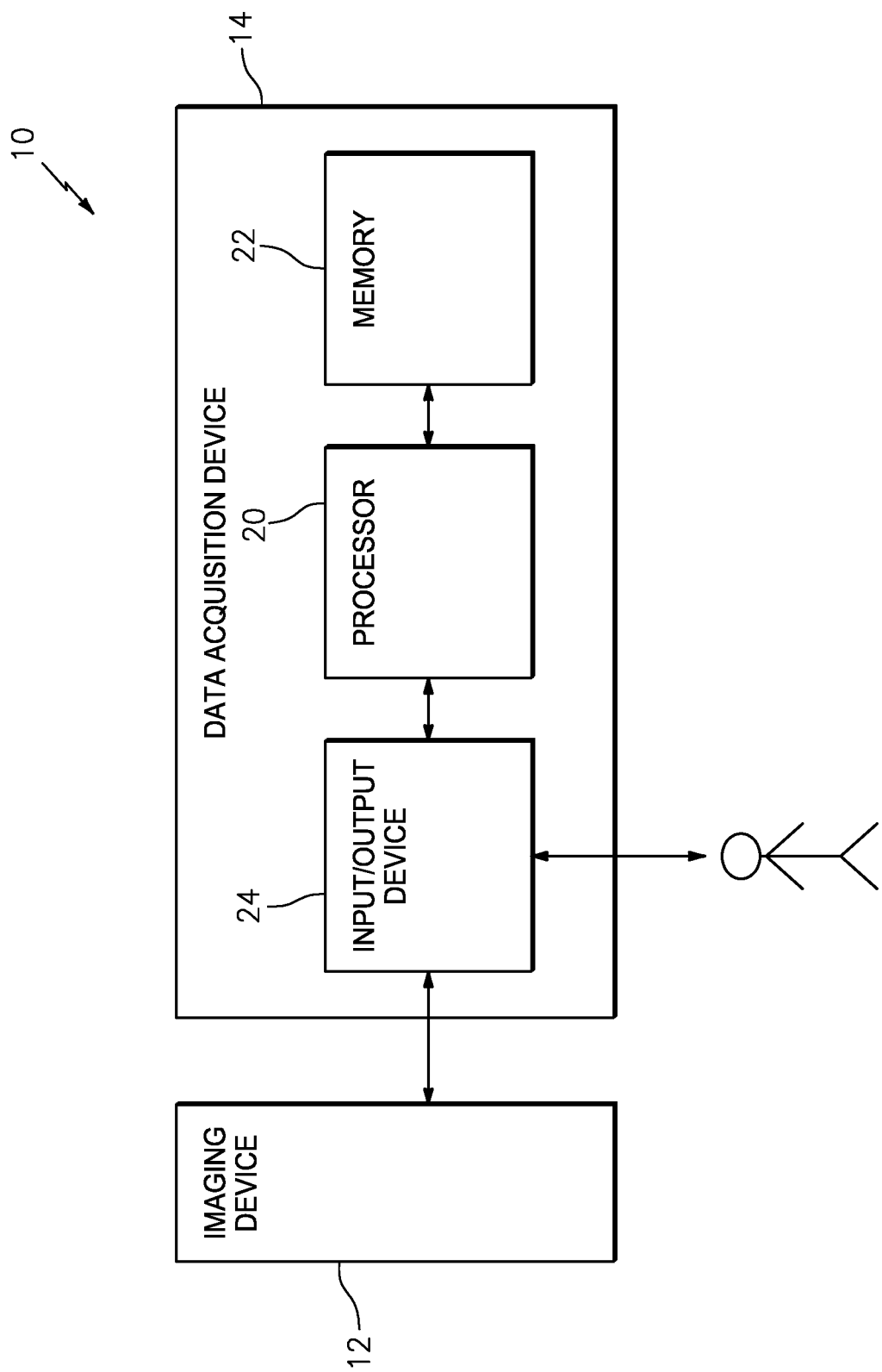
FIG. 2 illustrates a block diagram of a data acquisition device for the imaging system of FIG. 1, in accordance with one or more aspects of the present disclosure.

Referring to FIGS. 1 and 2, a vibration measurement system 10 according to various aspects of the present disclosure is illustrated. Embodiments of the present vibration measurement system 10 may be configured for measurement of structural vibration of a variety of different components as well as components undergoing various forms of excitation such as, but not limited to, tonal, broadband, and/or flow-induced excitation. In general, the vibration measurement system 10 includes at least one imaging device 12 and a data acquisition device 14 in signal communication with the at least one imaging device 12. As will be discussed in further detail, the at least one imaging device 12 is configured to capture and/or record images of an imaging surface 102 of a component 100. In various embodiments, the vibration measurement system 10 may include a light source 16 configured to provide suitable lighting of the component 100 for image capture by the at least one imaging device 12. The light source 16 may be in signal communication with the data acquisition system 14 for control of the light source 16 or, alternatively, may be independent of the data acquisition system 14. In various embodiments, the vibration measurement system 10 may include one or more non-imaging sensors in signal communication with the data acquisition device 14 such as, but not limited to, accelerometers, temperature detectors, etc. For example, as shown in FIG. 1, the vibration measurement system 10 may include an accelerometer 18 in contact with a surface (e.g., a surface other than the imaging surface 102)

of the component 100. However, it should be understood that additional, non-imaging sensors, such as the accelerometer 18, are not required for operation of the vibration measurement system 10 to measure vibration characteristics of the component 100 and the present disclosure is not limited to the use of any additional sensors or types of additional sensors in the vibration measurement system 10. Signal communication between the data acquisition device 14 and the at least one imaging device 12, the light source 16, and/or the accelerometer 18 may be accomplished by a wired or wireless connection.

The at least one imaging device 12 may include two or more imaging devices, such as a first imaging device 12A and a second imaging device 12B spaced from the first imaging device 12A, as shown in FIG. 1. The use of two or more imaging devices permits the development of three-dimensional DIC data for surface displacement of the component 100, as depth displacements of the component imaging surface 102 can be determined based on triangulation using the different image perspectives of the two or more imaging devices. In various embodiments, the at least one imaging device 12 may be a high-speed digital camera or any other suitable imaging device. In various embodiments, the at least one camera 12 may have a stereo camera configuration as shown, for example, by the first imaging device 12A and the second imaging device 12B of FIG. 1.

The data acquisition device 14 may be configured to control the operation of the at least one imaging device 12 as well as to receive and store image data provided by the at least one imaging device 12. In various embodiments, the data acquisition device 14 may be further configured to control the operation of the light source 16 as well as to receive and store data provided by one or more non-imaging sensors, synchronized to the frame rate of the at least one imaging device 12, including, for example, the accelerometer 18. The data acquisition device 14 includes a processor 20 which may be any type of computing device, computational circuit, or processing circuit capable of executing a series of instructions that are stored in memory 22. The data acquisition device 14 may include any combination of analog and digital components or control signals. The processor 20 of the data acquisition device 14 may include multiple processors and/or multicore CPUs and may include any type of processor, such as a microprocessor, digital signal processor, co-processors, a micro-controller, a micro-computer, a central processing unit, a field programmable gate array, a programmable logic device, a state machine, logic circuitry, analog circuitry, digital circuitry, etc., and any combination thereof. The instructions stored in memory 22 may represent one or more algorithms for controlling the aspects of the vibration measurement system 10, and the stored instructions are not limited to any particular form (e.g., program files, system data, buffers, drivers, utilities, system programs, etc.) provided they can be executed by the processor 20. The memory 22 may be a non-transitory computer readable storage medium configured to store instructions that when executed by the processor 20, cause the processor 20 to perform or cause the performance of certain functions. The memory 22 may be a single memory device or a plurality of memory devices. A memory device may include a storage area network, network attached storage, as well as a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the data acquisition device 14 may be achieved by the use of hardware, software, firmware, or any combination thereof. The data acquisition device 14 may also include input (e.g., a keyboard, a touch screen, etc.) and output devices (e.g., a monitor, sensor readouts, data ports, etc.) 24 that enable the operator to input instructions, receive data, etc.

In general, DIC techniques involve tracking a pattern 104 (e.g., a speckle pattern) on the imaging surface 102 of the component 100 in a sequence of images captured by the at least one imaging device 12. A first image of the imaging surface 102 taken by each of the at least one imaging device 12 may be a "reference image," for example, a baseline image to which subsequent images (i.e., "deformed images") of the imaging surface 102 are compared. DIC techniques, applied by the data acquisition device 14, may then be used to match the pattern 104 of the reference image and subsequent deformed images to calculate the displacement of the pattern 104 between the reference image and the deformed images. In some cases, the imaging surface 102 of the component 100 may have inherent features which provide a suitable pattern 104 for application of a DIC technique, however, in other cases the pattern 104 may be artificially applied to the imaging surface 102. The features (e.g., speckles) of the pattern 104 may be randomly positioned on the imaging surface 102 but may be uniform in size and/or shape. The present disclosure, however, is not limited to any particular form or application of the pattern 104.

Figure 3:
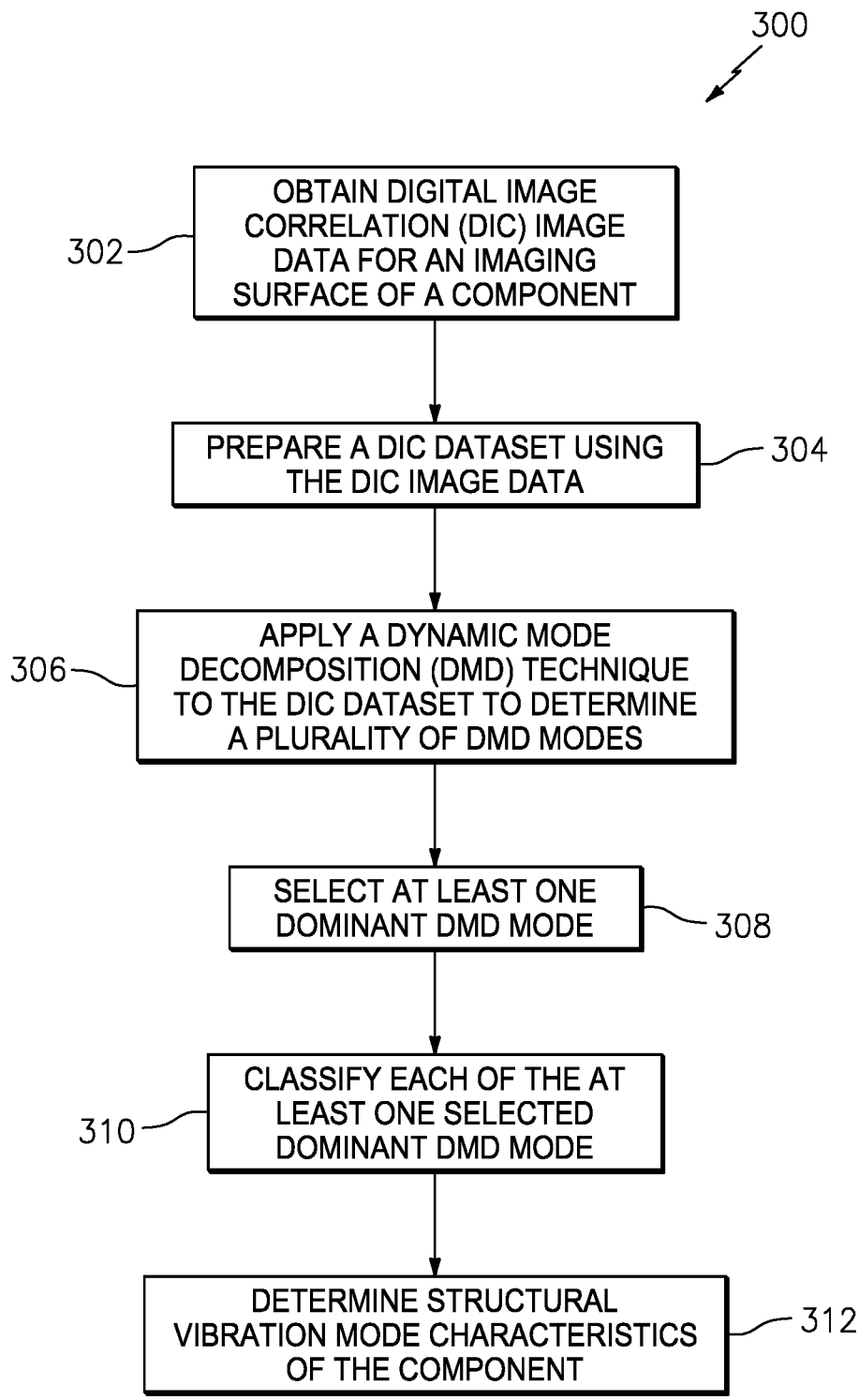
FIG. 3 illustrates a flowchart for a method for determining structural vibration mode characteristics of a component, according to one or more aspects of the present disclosure.

Referring to FIGS. 1-3, the present disclosure includes a method 300 for determining structural vibration mode characteristics of a component (e.g., the component 100). The method 300 may be performed by the vibration measurement system 10 described above. For example, the memory 22 of the data acquisition device 14 may contain instructions directed to the method 300 which, when executed by the processor 20, cause the processor 20 to execute one or more steps of the method 300.

In Step 302, DIC image data for the imaging surface 102 of the component 100 is obtained. The DIC image data may include a plurality of images of the imaging surface 102 recorded by the at least one imaging device 12 which is positioned in a line-of-sight of the imaging surface 102. The plurality of images may be stored in the memory 22 of the data acquisition device 14 for subsequent analysis. As previously discussed, aspects of the present disclosure may be applied to DIC image data which may be generated during flow-obstruction scenarios to filter out flow-induced perturbations and to extract accurate structural vibration information from the component 100. Accordingly, a fluid flow 106 may be present between the at least one imaging device 12 and the imaging surface 102 of the component 100 as the at least one imaging device 12 records the plurality of images of the imaging surface 102. The fluid flow 106 may be a product of relative motion between the imaging surface 102 and a surrounding fluid.

In Step 304, a DIC dataset is prepared for the component 100 using the DIC image data as an input. The DIC image data, represented by the plurality of images of the imaging surface 102, includes a time history of z-displacements of a fixed grid of points $(x_i, y_j)$, $i=1, \ldots, N_x$, $j=1, N_y$ on the component 100 under a specific excitation condition (e.g., tonal, broadband, or fluid flow-induced excitation). Let $z(x_i, y_j, t)$, $t=0, \ldots, T-1$ be z-displacement measurements over the fixed grid. The displacement map $z(x_i, y_j, t)$ is rearranged in the form of a vector $z_t \in R^{N_x N_y}$ at each instance, and a DIC image data matrix is created:

$$X=[z_0, \ldots, z_{T-1}], \quad (1)$$

where $X \in R^{N_x N_y \times T}$.

In various embodiments, preparing the DIC dataset may include denoising the DIC image data matrix. Proper orthogonal decomposition (POD) or Principal Component Analysis (PCA) may be applied to the data matrix X, and dominant components of the DIC image data matrix may be selected, thereby removing the low energy modes of the DIC image data matrix which correspond to noise. The DIC image data may then be projected on the dominant components creating a reduced matrix $\hat{X} \in R^{n \times T}$, where $n \ll N_x N_y$:

$$\hat{X}=[\hat{z}_0, \ldots, \hat{z}_{T-1}], \quad (2)$$

where $\hat{z}_t \in R^n$, $t=1, \ldots, T-1$.

In Step 306, a dynamic mode decomposition (DMD) technique is applied to the DIC dataset to determine a plurality of DMD modes. As will be discussed in further detail, application of the DMD technique to the DIC dataset may be accomplished by several numerical techniques for carrying out a Koopman Mode Decomposition directly from the DIC image data of the DIC dataset, and the present disclosure is not limited to any particular DMD technique. Application of the DMD technique to the DIC dataset includes fitting a linear operator to the DIC image data, $$\hat{X}^+ = A\hat{X}^-, \quad (3)$$

where, $\hat{X}^+ = [\hat{z}_1, \ldots, \hat{z}_{T-1}]$ and $\hat{X}^- = [\hat{z}_0, \ldots, \hat{z}_{T-2}]$.

In order to debias the impact of noise present in the DMD data output of the DMD computation, different DMD variations can be applied including total least squares DMD and forward backward DMD. Additionally, for identification of wave structures in the DMD data, time delay embedding may be used. For example, time delay embedding of $d=1$ implies data matrices are formed from vectors of 1-delays, e.g., $\hat{z}_t^e = (\hat{z}_t\ \hat{z}_{t+1})'$, $$\hat{X}^- = \begin{bmatrix} \hat{z}_1 & \hat{z}_2 & \ldots & \hat{z}_{T-3} \\ \hat{z}_2 & \hat{z}_3 & \ldots & \hat{z}_{T-2} \end{bmatrix}, \hat{X}^+ = \begin{bmatrix} \hat{z}_2 & \hat{z}_2 & \ldots & \hat{z}_{T-2} \\ \hat{z}_3 & \hat{z}_3 & \ldots & \hat{z}_{T-1} \end{bmatrix}. \quad (4)$$

Note, for example, that for extracting structural modes from the DIC dataset, which are positional in nature, a minimum embedding dimension of $d=1$ may be required. Furthermore, to extract different vibration modes excited by a broadband excitation, large values of d, for example, $d \gg 1$, may be used in practice.

The solution of Equation (3) can be obtained, for example, via least squares $A = \hat{X}^+ (\hat{X}^-)^\dagger$, where † denotes the pseudo inverse of a matrix. Next the eigenvalue and eigenvector pairs $(=_j, \upsilon_j)$, $j=1, \ldots, m$ of A are computed. In some cases, the data $\hat{X}$ may be low rank, which can be exploited to make eigen decompositions of A computationally more efficient by projecting A onto the reduced basis formed from the POD/PCA of $\hat{X}^-$. Finally, the amplitude vector $\alpha = (\alpha_1, \ldots, \alpha_m)'$ associated with DMD may be calculated by solving a least squares problem, for example, $\Phi \Lambda \alpha = \hat{z}_1$, where $\Phi$ is a matrix formed from the eigenvectors $\upsilon_j$ as columns, and $\Lambda = diag(\lambda_i, \ldots, \lambda_m)$ is a diagonal matrix formed from the eigenvalues $\lambda_j$. $S=\{(\lambda_j, \upsilon_j, \alpha_j), j=1, \ldots, m\}$ may be used to refer to the set of a plurality of DMD eigenvalues, DMD modes, and DMD mode amplitudes, respectively.

In terms of DMD eigenvalues, modes, and amplitudes, the time evolution of data can be decomposed as:

$$\hat{z}_t \approx \sum_{j=1}^m \lambda_j^t \alpha_j \upsilon_j, t=0, \ldots, T-1. \quad (5)$$

In various embodiments, spatiotemporal extensions of DMD may be applied to decompose the DIC data in both space and time, as relevant.

In Step 308, at least one dominant DMD mode is selected from the plurality of DMD modes. In this step, the dynamically most important subset of DMD modes is selected from the set S. As the vibration measurement of the component 100 is based on oscillatory modes, all DMD modes of the plurality of DMD modes with real eigenvalues may be discarded, yielding remainder DMD modes of the plurality of DMD modes. Next, dominant DMD modes may be selected from the remainder DMD modes. Determining which DMD modes are dominant can be accomplished, for example, by ranking the remainder DMD modes based on a norm of their amplitudes $|\alpha_j|$ or scaled amplitudes $|\lambda_j \alpha_j|$. Alternatively, in various embodiments, a sparse DMD method can be applied where a mixed norm optimization problem is solved. Let $S_r = \{(\lambda_{ji}, \upsilon_{ji}, \alpha_{ji}), i=1, \ldots, r\} \subset S$ be the set of selected modes as a result of this mode selection step. Once the remainder DMD modes have been ranked, the dominant DMD modes may be selected based on a threshold amplitude or scaled amplitude. The threshold may be selected, for example, by observing the difference in the reconstructed time evolution of data using Equation 5 and the actual data and selecting the highest ranked modes in Equation 5, such that this difference or reconstruction error is acceptable. The use of a sparse DMD method may include an automatic optimization process which includes a tradeoff in the reconstruction error and number of dominant DMD modes retained based on a user selected weight which determines the importance of reconstruction error relative to the sparsity of the solution.

In Step 310, each of the at least one selected dominant DMD mode may be classified as a standing wave or a traveling wave. For example, a matrix $M_j = [\alpha_j\ b_j]$ may be formed for each selected dominant DMD mode where $\alpha_j$ and $b_j$ are real and imaginary parts of complex mode shapes $\upsilon_j = \alpha_j + \sqrt{-1} b_j$. Let the condition number of $M_j$ be $c_j = cond(M_j)$. Then, the selected dominant DMD modes for which $c_j \gg 1$ are classified as standing waves and the remaining selected dominant DMD modes are classified as travelling waves. Let $S_w = \{(\lambda_{ji}, \upsilon_{ji}, \alpha_{ji}), i=1, \ldots, p\} \subset S_r$ be the subset of selected dominant DMD modes classified as standing waves.

In Step 312, structural vibration mode characteristics of the component 100 may be determined by extracting the structural vibration mode characteristics from each of the at least one selected dominant DMD mode having a standing wave classification. The structural vibration mode characteristics for the component 100 may include, for example, oscillation frequencies $f_j$ and damping ratios $\zeta_j$ which, can be extracted as follows, $$f_j = \frac{|s_j|}{2\pi} \quad (6)$$

-continued $$\zeta_j = -\frac{real(s_j)}{|s_j|} \quad (7)$$

where, $$s_j = \frac{\lambda_j}{\Delta t}$$

and $\Delta t$ is the sampling period of the DIC data.

Figure 4:
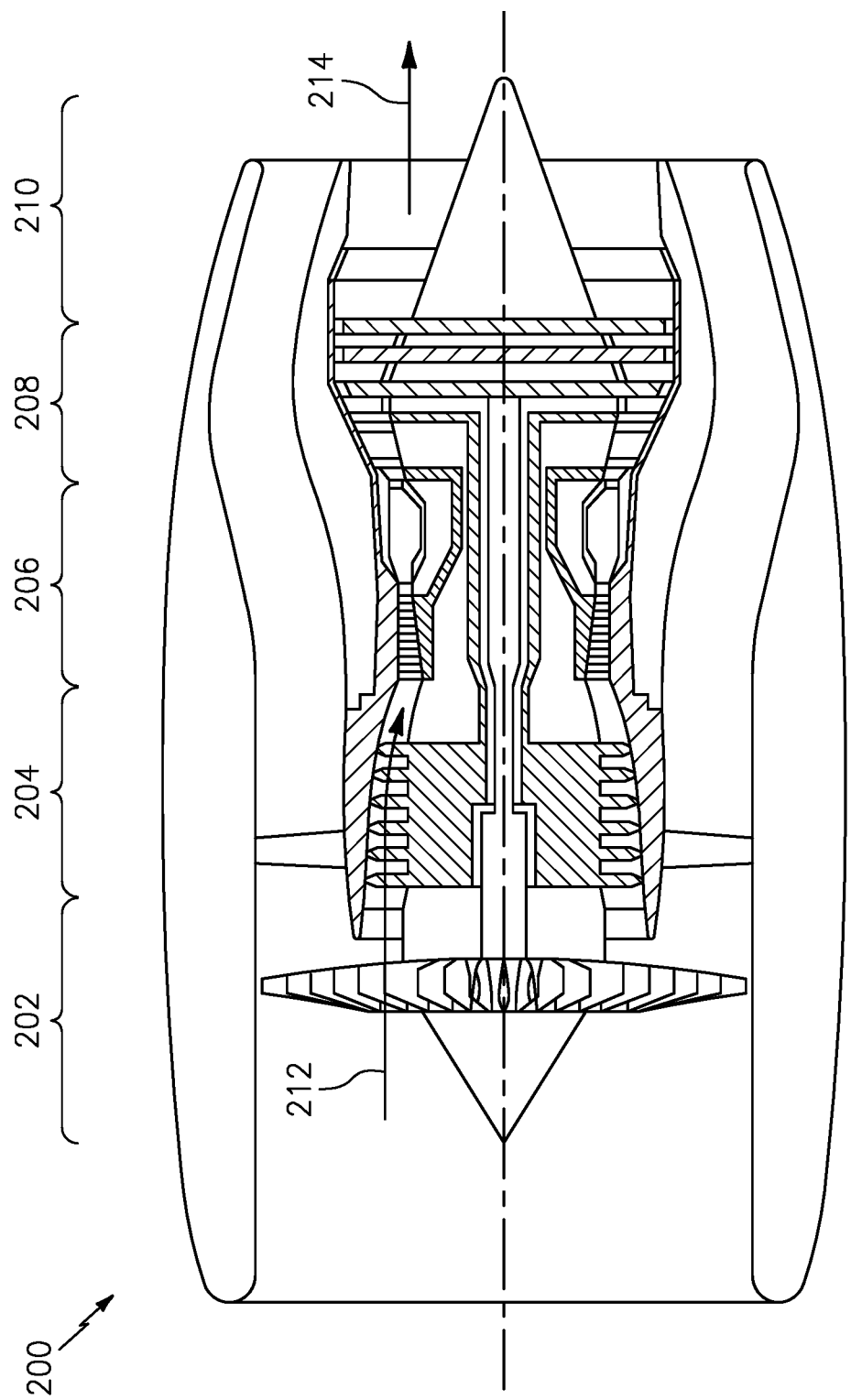
FIG. 4 illustrates a side, cross-sectional view of a gas turbine engine, in accordance with one or more aspects of the present disclosure.

Referring to FIGS. 1 and 4, aspects of the present disclosure may be used to measure vibration mode characteristics of a variety of components which may be exposed to a fluid flow (such as the fluid flow 106), for example, during operation or testing. The components may include components of equipment which, when operated, may produce or otherwise cause a fluid flow to be present in the vicinity of the test component including, but not limited to, engines, pumps, fans, nozzles, etc. For example, the presence of the fluid flow 106 between the at least one imaging device 12 and the imaging surface 102 of the component 100 may be a result of the operation of equipment which includes the component 100. In other words, operation of the equipment may direct the fluid flow 106 across the imaging surface 102 of the component 100 in a direction between the component 100 and the at least one imaging device 12. The presence of the fluid flow 106 between the at least one imaging device 12 and the imaging surface 102 may be the result of directing the fluid flow 106 toward or in the vicinity of the component 100 (e.g., high speed and/or high temperature fluid flow imparted on the component 100 in a wind tunnel or other test facility or by test equipment) as shown, for example, in FIG. 1. The presence of the fluid flow 106 between the at least one imaging device and the imaging surface 102 may also be the result of motion of the component 100 (e.g., motion of equipment which includes the component 100) through a fluid. However, aspects of the present disclosure are not limited to any particular source of the fluid flow 106 and may be used to measure vibration mode characteristics of components with or without fluid flow present in the vicinity of the component and the present disclosure is not limited to components or equipment having any particular configuration.

For further example, the vibration measurement system 10 and/or the method 300 disclosed herein may be used during operational testing of a gas turbine engine, such as the gas turbine engine 200 shown in FIG. 4. The gas turbine engine 200 is disclosed herein as a two-spool turbofan engine that generally includes a fan section 202, a compressor section 204, a combustor section 206, a turbine section 208, and an exhaust section 210. The fan section 202 followed by the compressor section 204 drives air along a core flowpath 212 for compression and communication into the combustor section 206, expansion through the turbine section 208, and then discharge through the exhaust section 210 as shown by the engine exhaust 214. During operational testing of the gas turbine engine 200, heated fluids of the core flowpath 212 or the engine exhaust 214, over a range of conditions from subsonic to supersonic fluid flows, may make it difficult or impossible to measure vibration mode characteristics of components in or near the heated fluid flowpaths using conventional, on-contact vibration measurement sensors such as accelerometers (e.g., the on-contact sensors may not be capable of operating within the heated fluid flow field or may disrupt the fluid flow profile along components within the fluid flowpath). Further, as discussed above, fluid flow in the vicinity of these component(s) distorts the DIC vibration measurements due to density gradients (e.g., shocks, turbulence, and temperature gradients). Similar difficulties in vibration measurement involving fluid flows may be encountered in other types of equipment and with other types of equipment testing and operation and the present disclosure is not limited to use with gas turbine engine testing.

Accordingly, aspects of the present disclosure may be used to measure vibration mode characteristics of components which would otherwise be difficult or impossible with conventional vibration measurement techniques. As discussed above, the vibration measurement system 10 and/or method 300 may be used to filter out fluid flow-induced distortions to accurately measure the mode shapes and vibratory response of one or more components (e.g., component 100) using DIC image data viewed through turbulent fluid flow and may be applied to components undergoing various forms of excitation such as, but not limited to, tonal, broadband, and/or flow-induced excitation. Thus, the present disclosure enables extraction of structural vibration characteristics from DIC image data when optical field of view is distorted by fluid flow disturbance and may additionally be applied in scenarios where installing physical, on-contact sensors is not practical or is challenging. Further, aspects of the present disclosure are scalable to processing high-resolution full-field data which is routinely generated during DIC measurements.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A method for determining structural vibration mode characteristics of a component, the method comprising:
obtaining digital image correlation (DIC) image data by recording a plurality of images of an imaging surface of a component with at least one imaging device, and the imaging surface has a pattern;
preparing a (DIC) dataset for the component using the DIC image data;
applying a dynamic mode decomposition (DMD) technique to the DIC dataset to determine a plurality of DMD modes;

selecting at least one dominant DMD mode from the plurality of DMD modes;

classifying each of the at least one selected dominant DMD mode as a standing wave or a traveling wave; and determining structural vibration mode characteristics of the component by extracting the structural vibration mode characteristics from each of the at least one selected dominant DMD mode having a standing wave classification.

2. The method of claim 1, wherein selecting the at least one dominant DMD mode comprises discarding all DMD modes of the plurality of DMD modes which comprise real eigenvalues, yielding remainder DMD modes of the plurality of DMD modes.

3. The method of claim 2, wherein selecting the at least one dominant DMD mode further comprises ranking the remainder DMD modes based on a norm of their amplitudes or scaled amplitudes.

4. The method of claim 3, wherein selecting the at least one dominant DMD mode further comprises selecting the ranked remainder DMD modes based on a threshold value.

5. The method of claim 1, wherein the vibration mode characteristics comprise oscillation frequencies and damping ratios.

6. The method of claim 1, further comprising directing a fluid flow in a direction between the component and the at least one imaging device as the imaging device records the plurality of images of the imaging surface.

7. The method of claim 1, wherein the DIC dataset includes a DIC image data matrix and wherein preparing the DIC dataset includes denoising the DIC image data matrix prior to applying the DMD technique to the DIC dataset.

8. A system for determining structural vibration mode characteristics of a component, the system comprising:
at least one imaging device, and the at least one imaging device includes a first imaging device and a second imaging device spaced from the first imaging device; and
a data acquisition device in signal communication with the at least one imaging device, the data acquisition device comprising:
a processor; and
memory in signal communication with the processor, the memory containing instructions recorded therein which, when executed by the processor, cause the processor to:
prepare a digital image correlation (DIC) dataset;
apply a dynamic mode decomposition (DMD) technique to the DIC dataset to determine a plurality of DMD modes;
select at least one dominant DMD mode from the plurality of DMD modes;
classify each of the at least one selected dominant DMD mode as a standing wave or a traveling wave; and
determine structural vibration mode characteristics by extracting the structural vibration mode characteristics from each of the at least one selected dominant DMD mode having a standing wave classification.

9. The system of claim 8, further comprising the component, wherein the component comprises an imaging surface and the at least one imaging device is positioned to obtain DIC image data from the imaging surface of the component and wherein the DIC dataset includes the DIC image data.

10. The system of claim 9, wherein the imaging surface includes a pattern.

11. The system of claim 9, further comprising equipment including the component, wherein the equipment is configured to direct a fluid flow across the imaging surface of the component and the fluid flow is located between the component and the at least one imaging device.

12. The system of claim 8, wherein selecting the at least one dominant DMD mode comprises discarding all DMD modes of the plurality of DMD modes which comprise real eigenvalues, yielding remainder DMD modes of the plurality of DMD modes.

13. The system of claim 12, wherein selecting the at least one dominant DMD mode further comprises ranking the remainder DMD modes based on a norm of their amplitudes or scaled amplitudes.

14. The system of claim 13, wherein selecting the at least one dominant DMD mode further comprises selecting the ranked remainder DMD modes based on a threshold value.

15. The system of claim 8, wherein the vibration mode characteristics comprise oscillation frequencies and damping ratios.

16. The system of claim 8, further comprising at least one accelerometer in signal communication with the data acquisition device, the at least one accelerometer in contact with the component.

17. The system of claim 16, wherein the at least one accelerometer is in contact with a non-imaging surface.

18. A method for determining structural vibration mode characteristics of a component, the method comprising:
directing a fluid flow across an imaging surface of the component in a direction between the component and at least one imaging device;
obtaining digital image correlation (DIC) image data by recording a plurality of images of the imaging surface with at least one imaging device as the fluid flow is directed across the imaging surface of the component;
preparing a DIC dataset which includes the DIC image data;
applying a dynamic mode decomposition (DMD) technique to the DIC dataset to determine a plurality of DMD modes;
selecting at least one dominant DMD mode from the plurality of DMD modes;
classifying each of the at least one selected dominant DMD mode as a standing wave or a traveling wave; and
determining structural vibration mode characteristics of the component by extracting the structural vibration mode characteristics from each of the at least one selected dominant DMD mode having a standing wave classification.

* * * * *